US009723494B2

(12) United States Patent
Belz et al.

(10) Patent No.: US 9,723,494 B2
(45) Date of Patent: Aug. 1, 2017

(54) AUGMENTED REALITY VISUAL WI-FI SIGNAL

(71) Applicants: AT&T Intellectual Property I, L.P., Atlanta, GA (US); AT&T Mobility II LLC, Atlanta, GA (US)

(72) Inventors: Steven Belz, Sunnyvale, TX (US); Constance Missimer, Seattle, WA (US); Greg W. Edwards, Austin, TX (US); James H. Pratt, Round Rock, TX (US); Michael Lattanzi, Bothell, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/932,103

(22) Filed: Nov. 4, 2015

(65) Prior Publication Data
US 2017/0127289 A1    May 4, 2017

(51) Int. Cl.
*H04W 40/00* (2009.01)
*H04W 16/18* (2009.01)
*H04W 40/24* (2009.01)
*G06T 19/00* (2011.01)
*G06K 9/00* (2006.01)

(52) U.S. Cl.
CPC ........ *H04W 16/18* (2013.01); *G06K 9/00671* (2013.01); *G06T 19/006* (2013.01); *H04W 40/244* (2013.01)

(58) Field of Classification Search
CPC . H04W 84/045; H04W 52/244; H04W 24/02; H04W 88/08; H04W 52/143; H04W 52/243; H04W 24/10; H04W 16/32; H04W 52/343; H04W 52/245; H04W 52/325; H04W 52/367; H04W 16/10; H04W 52/146; H04W 72/082
USPC ........................................................ 455/446
See application file for complete search history.

(56) References Cited

U.S. PATENT DOCUMENTS

| 2007/0178911 | A1 | 8/2007 | Baumeister et al. |
| 2011/0018732 | A1* | 1/2011 | Cho ...................... G01S 5/0236 340/8.1 |
| 2012/0252521 | A1* | 10/2012 | Nagaraja ............. H04W 52/243 455/522 |
| 2013/0172010 | A1 | 7/2013 | Kang et al. |
| 2014/0004874 | A1 | 1/2014 | Schwartz et al. |
| 2014/0295878 | A1 | 10/2014 | Yang et al. |

(Continued)

FOREIGN PATENT DOCUMENTS

WO    WO 2013/121036 A1    8/2013

OTHER PUBLICATIONS

Madhavapeddy, e al., "A study of Bluetooth Propagation Using Accurate Indoor Location Mapping", Ubiquitous Computing, 2005, 105-122.

*Primary Examiner* — Kwasi Karikari
(74) *Attorney, Agent, or Firm* — Baker & Hostetler LLP

(57) ABSTRACT

A method includes identifying a location of at least on of a plurality of electronic devices within an area of interest. The method includes, based on at least the location of the at least one of the plurality of electronic devices, determining signal strength at a plurality of points within the area of interest. The method includes providing a modification of the area of interest to improve the signal strength at one of the plurality of points.

15 Claims, 11 Drawing Sheets

(56) References Cited

U.S. PATENT DOCUMENTS

| | | |
|---|---|---|
| 2015/0063135 A1 | 3/2015 | Park et al. |
| 2015/0195682 A1 | 7/2015 | Lee |
| 2015/0222372 A1 | 8/2015 | Le Grand et al. |
| 2015/0223189 A1 | 8/2015 | Le Grand et al. |

* cited by examiner

AUGMENTED REALITY VISUAL WI-FI SIGNAL

TECHNICAL FIELD

The technical field generally relates to managing wireless networks and, more specifically, to systems and methods for detecting wireless signal strength over an area of interest.

BACKGROUND

In homes and businesses, the use of wireless networks has become nearly ubiquitous. A common problem users face is weak signal strength in all or part of their location. Frequently, users turn to customer service to solve the problem, as the users may not have access to useful information for resolving or improving their wireless service. There is a need for being able to visualize or map wireless signal strength in an area. Using this information, alone or with other information related to interference sources, connected devices, and router configurations, a number of suggestions for improving the wireless signal strength in a location may be determined. There is a need for methods and systems that map and troubleshoot wireless signal strength over an area of interest.

SUMMARY

The disclosed systems and methods may allow for mapping Wi-Fi signal strength in an area of interest. This information may include mapping router signal strength and interference signals. This information may be used to improve signal strength in a portion of the area of interest.

The present disclosure is directed to a method. A method may include identifying a location of at least one of a plurality of electronic devices within an area of interest. The method may include, based on at least the location of the at least one of the plurality of electronic devices, determining signal strength at a plurality of points within the area of interest. The method may include providing a modification of the area of interest to improve the signal strength at one of the plurality of points.

The present disclosure is also directed to a device. The device may include a display configured to display a map and a processor. The device may also include memory communicatively coupled to the processor. The memory may store executable instructions that, when executed by the processor, cause the processor to effectuate operations. The operations may include identifying a location of at least one of a plurality of electronic devices within an area of interest. The operations may also include, based on at least the location of the at least one of the plurality of electronic devices, determining signal strength at a plurality of points within the area of interest. The operations may also include determining a modification of the area of interest to improve the signal strength at one of the plurality of points.

The present disclosure is also directed to a nontransitory computer-readable medium. The non-transitory computer-readable medium may comprise instructions that, when executed by a processor, cause the processor to effectuate operations. The operations may include identifying a location of at least one of a plurality of electronic devices within an area of interest and, based on at least the location of the at least one of the plurality of electronic devices, determining signal strength at a plurality of points within the area of interest. The operations may also include determining a modification of the area of interest to improve the signal strength at one of the plurality of points.

BRIEF DESCRIPTION OF THE DRAWINGS

Aspects of the herein described telecommunications network are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
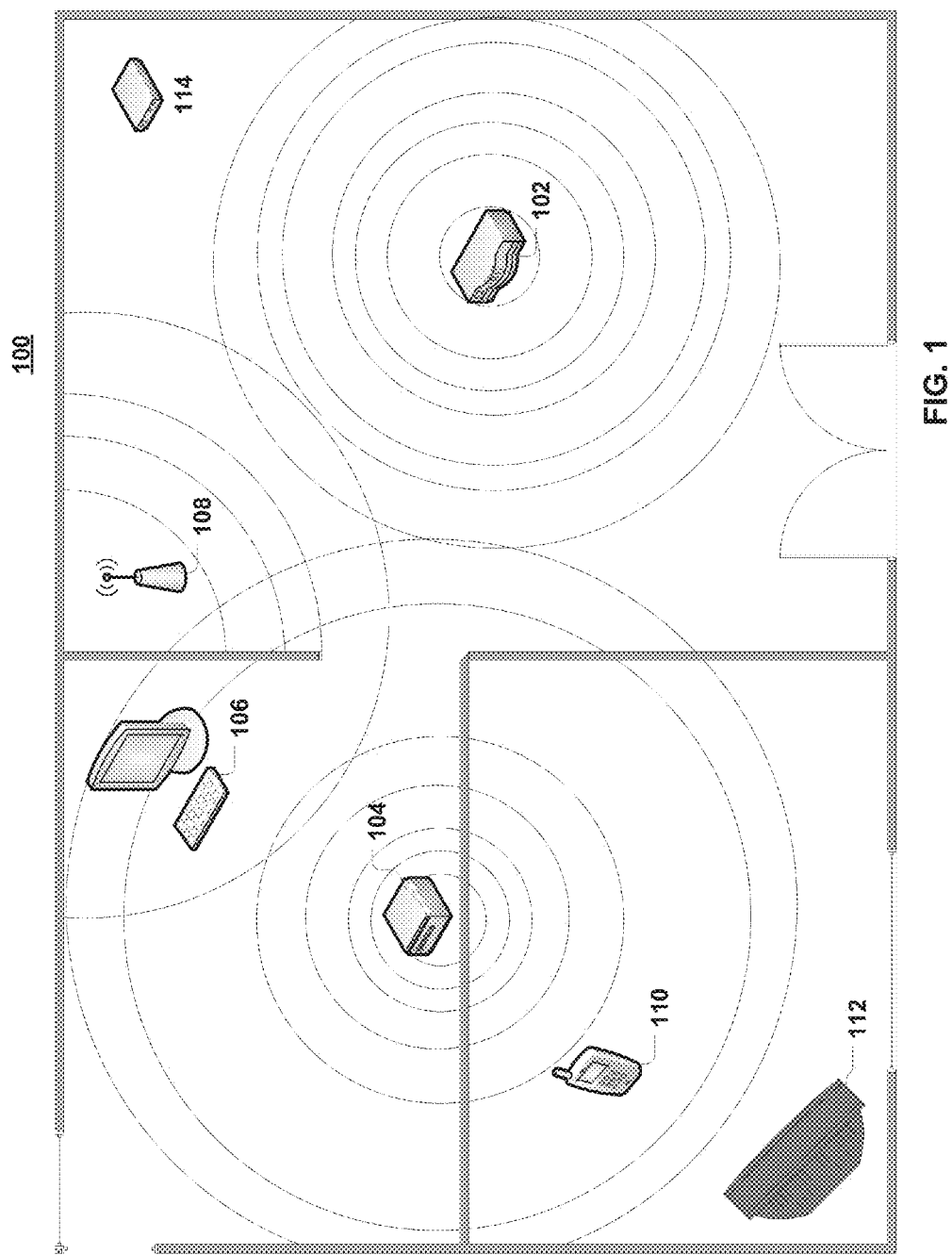
FIG. 1 illustrates an exemplary area of interest whose signal strength may be mapped.

FIG. 1 illustrates an exemplary area of interest 100, including three rooms in a building. While area of interest 100 includes a building or portion of a building, other physical spaces may be used. For example, area of interest 100 may be a room, a combination of rooms, a combination of rooms and outdoor space, or the like. As another example, area of interest 100 may be three-dimensional. For example, area of interest 100 may include multiple floors in a building. As another example, area of interest 100 may be an outdoor location, such as an outdoor event space, a sports stadium, a green space, a mixed-use development, or the like.

Area of interest 100 may include network elements, such as a router/modem 102, a network repeater 104, a computer 106, an access point 108, and a mobile device 110. The network elements may be communicatively coupled to one another through the network. For example, mobile device 110 and computer 106 may be communicatively connected to the Internet through one or more of router 102, network repeater 104, or access point 108. These devices may optionally be connected to other networks. For example, mobile device 110 may be connected to a cellular network. Area of interest 100 may include other electronic devices, such as a television 112, that are not connected to the network. Area of interest 100 may include a modem 114. These other electronic devices may or may not have network capabilities. While not shown, area of interest 100 may include other elements and objects, such as, for example, vegetation, furniture, persons, building elements like wiring, plumbing, insulation, windows, and walls. Area of interest 100 may be any physical space In general, network strength refers to signal strength within a wireless network. Network strength may be measured at references points throughout an area of interest. Network field strength may be affected by a number of factors. For example, the power delivered to a transmitting antenna will affect the field strength of signals emitted by that antenna. For example, reference points located farther from the antenna may have a lower signal strength. Further, signal strength may be affected by interference signals, or construction materials that attenuate sign strength. Mapping signal strength may be advantageous when deciding how to change the configuration of routers 102, repeaters 104, or access points 108.

The network strength of area of interest 100 may be mapped by a network device 200. Network device 200 may be a standalone device located within or outside of area of interest 100. Optionally, network device 200 may comprise one or more of router 102, network repeater 104, computer 106, mobile device 108, or router 114. Network device 200 may include any devices that are capable of communicating with or detecting signals from other devices in area of interest 100. Portions of network device 200 may be considered stationary or portable. As evident from the herein description, a network device, a communications device, or a mobile device is not to be construed as software per se. An exemplary network device is shown in FIG. 2.

Figure 2:
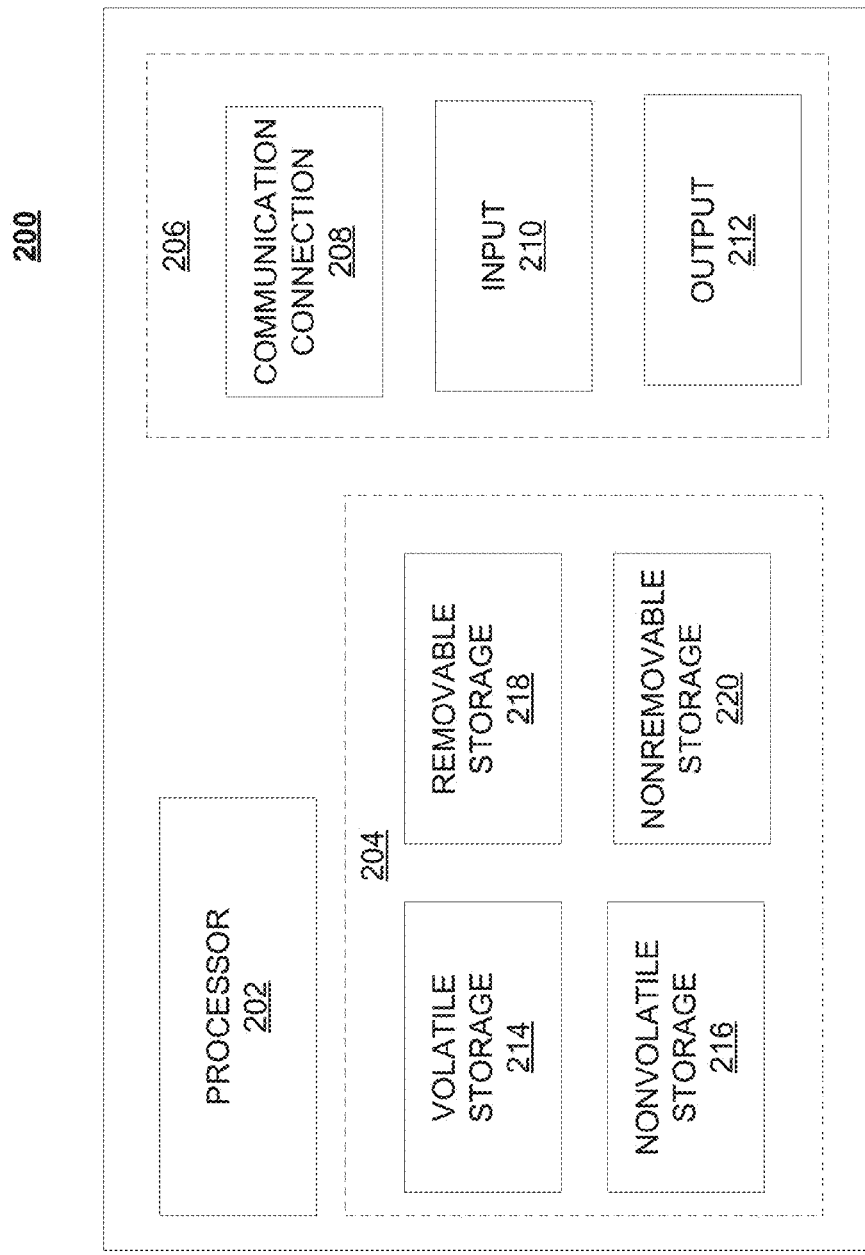
FIG. 2 is a schematic of an exemplary network device that may map signal strength and provide adjustments to the configuration of the area to change the wireless signal strength.

FIG. 2 is a block diagram of network device 200 of a telecommunication network as described herein. For example, router 102, repeater 104, access point 108, computer 106, mobile device 110, or router 114 may comprise, include, or communicate with network device 200. Network device 200 may comprise hardware or a combination of hardware and software. The functionality to facilitate telecommunications via a telecommunications network may reside in one or combination of network devices 200. Network device 200 depicted in FIG. 2 may represent or perform functionality of an appropriate network device 200, or combination of network devices 200, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 2 is exemplary and not intended to imply a limitation to a specific implementation or configuration. Thus, network device 200 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 200 may comprise a processor 202 and a memory 204 coupled to processor 202. Memory 204 may contain executable instructions that, when executed by processor 202, cause processor 202 to effectuate operations associated with mapping wireless signal strength. As evident from the description herein, network device 200 is not to be construed as software per se.

In addition to processor 202 and memory 204, network device 200 may include an input/output system 206. Processor 202, memory 204, and input/output system 206 may be coupled together (coupling not shown in FIG. 2) to allow communications therebetween. Each portion of network device 200 may comprise circuitry for performing functions associated with each respective portion. Thus, each portion may comprise hardware, or a combination of hardware and software. Accordingly, each portion of network device 200 is not to be construed as software per se. Input/output system 206 may be capable of receiving or providing information from or to a communications device or other network entities configured for telecommunications. For example input/output system 206 may include a wireless communications (e.g., 2.5G/3G/4G/GPS) card. Input/output system 206 may be capable of receiving or sending video information, audio information, control information, image information, data, or any combination thereof. Input/output system 206 may be capable of transferring information with network device 200. In various configurations, input/output system 206 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 206 may comprise a Wi-Fi finder, a two-way GPS chipset or equivalent, or the like, or a combination thereof.

Input/output system 206 of network device 200 also may contain communication connection 208 that allows network device 200 to communicate with other devices, network entities, or the like. Communication connection 208 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 206 also may include an input device 210 such as keyboard, mouse, pen, voice input device, or touch input device. Input/output system 206 may also include an output device 212, such as a display, speakers, or a printer.

Processor 202 may be capable of performing functions associated with telecommunications, such as functions for processing broadcast messages, as described herein. For example, processor 202 may be capable of, in conjunction with any other portion of network device 200, determining a type of broadcast message and acting according to the broadcast message type or content, as described herein.

Memory 204 of network device 200 may comprise a storage medium having a concrete, tangible, physical structure. As is known, a signal does not have a concrete, tangible, physical structure. Memory 204, as well as any computer-readable storage medium described herein, is not to be construed as a signal. Memory 204, as well as any computer-readable storage medium described herein, is not to be construed as a transient signal. Memory 204, as well as any computer-readable storage medium described herein, is not to be construed as a propagating signal. Memory 204, as well as any computer-readable storage medium described herein, is to be construed as an article of manufacture.

Memory 204 may store any information utilized in conjunction with telecommunications. Depending upon the exact configuration or type of processor, memory 204 may include a volatile storage 214 (such as some types of RAM), a nonvolatile storage 216 (such as ROM, flash memory), or a combination thereof. Memory 204 may include additional storage (e.g., a removable storage 218 or a nonremovable storage 220) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 200. Memory 204 may comprise executable instructions that, when executed by processor 202, cause processor 202 to effectuate operations to map signal strengths in an area of interest.

Figure 3:
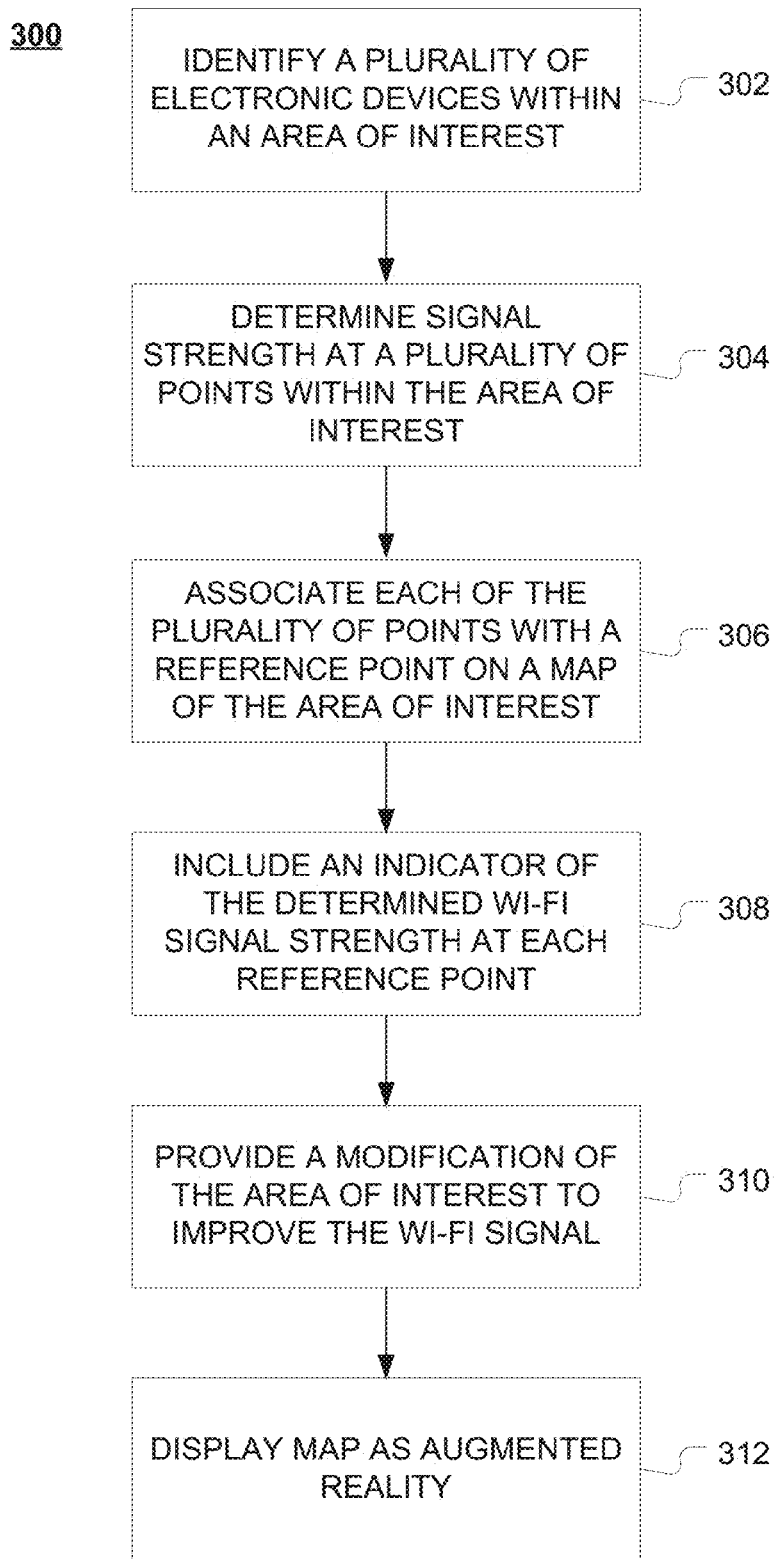
FIG. 3 is a flowchart of an exemplary process for mapping signal strength.

FIG. 3 provides a flowchart of a method 300 for mapping signal strength in area of interest 100. At step 302, method 300 may include identifying a plurality of electronic devices within area of interest 100. For example, network device 100 may identify any combination of router/modem 102, repeater 104, computer 106, access point 108, mobile device 110, or television 112. In an aspect, step 302 may be performed by analyzing user input. For example, at a user interface, such as input/output 206 of network device 202, a user may be able to select from a list or otherwise identify electronic devices in the area of interest. The identification may be limited to the location of a device or a type of device (e.g., router, mobile device, etc.). In an aspect, the identification for one or more electronic devices may be more detailed, including a model number or configuration of the electronic devices. In another aspect, network device 200 may identify the plurality of devices in area of interest 100 by detecting signals emitted by the network devices. For example, network device 200 may physically move throughout area of interest 100 "listening" for electronic signals. Optionally, network device 200 may query a user to identify any electronic devices that network device 200 detects.

In addition to detecting electronic devices that emit or receive transmissions, network device 100 may optionally detect sources of interference. For example, even if television 112 is a cathode ray tube (CRT) TV, that does not include any networking elements, signals emitted by television 112 may cause interference that may negatively impact wireless signal strength in a vicinity of television 112. In an aspect, network device 200 may detect other sources of electromagnetic interference (EMI). These sources may include, but are not limited to, other types of television, radios (AM, FM, or satellite), power lines, power supplies, microwaves, life support equipment (ventilators, defibrillators, pumps, etc.), motors, toaster ovens, electric blankets, ultrasonic pest control devices, lamps, Bluetooth devices, baby monitors, plain old telephone system (POTS) telephones, heaters, or the like. In an aspect, rather than identifying the type of device emitting EMI, network device 100 may detect the strength and location of EMI sources.

At step 304, method 300 may include determining signal strength at a plurality of points within area of interest 100. For example, step 304 may include identifying the plurality of points based on a user input. In an aspect, the plurality of points may be defined based on the shape or size of area of interest 100. For example, the plurality of points may be spaced throughout area of interest 100, such as at predefined distances from one another. In an aspect, the plurality of points may comprise locations of the electronic devices, such as computer 106 or modem/router 102. The plurality of points may comprise subdivisions of area of interest 100. For example, area of interest 100 may be divided into four quadrants, wherein each quadrant comprises an area of interest. Each of the plurality of points may vary in size from one another. For example, each point may comprise a room of the floor plan of area of interest 100.

Determining signal strength at the plurality of points may include one or a combination of methods. For example, any number of algorithms known in the art for calculating signal strength may be used. These algorithms may include algorithms based on the wireless access points. Optionally, the algorithms may factor EMI sources into the equation. As another example, network device 200 may measure signal strength at one or more of the plurality of points. These measurements may be used in lieu of the calculations, or to supplement, check, or modify the calculations. In an aspect, a combination of sampling signal strength at various locations, as well as known algorithms for calculating signal strength can be used to extrapolate estimated signal strengths at locations other than those where signal strength was measured.

At step 306, method 300 may include associating each of the plurality of points with a reference point on a map of area of interest 100. The map may be based on a floor plan of area of interest 100. This floor plan may be uploaded by a user, derived from premapping (scanning) the area, which may include a walkthrough of area of interest 100, derived from a database, built by a user at a portal, or the like. The map may optionally be based on other data. For example, the map may be based on electrical wiring, duct work, plumbing, or the like. Thus, the map may optionally show fluid flow (e.g., airflow through the duct work or water through the plumbing). The fluid flow may be calculated or determined using the laws of fluid dynamics. This information may be presented in the same or a different map than the wireless signal data.

Step 308 may require including an indicator of the Wi-Fi signal strength at one of the plurality of points at each associated reference point on the map. The indicators may be a combination of symbols or styling that may be used in mapping to represent signal strength. For example, the indicators may be a combination of symbols, contour lines, lines, colors, shapes, letters, or numbers. The size, density, frequency, or color of shapes or symbols may be varied to show varying strengths. For example, the map of FIG. 1 uses the density of contour lines to represent the signal strength. As one gets farther away from a wireless access source, the signal from that source is weaker. Step 308 may optionally show EMI as well. While not shown in FIG. 1, different symbols may be used to illustrate that television 112 is emitting EMI. These symbols may differ from the indicators that illustrate signal strength.

Based on the measured or calculated Wi-Fi signal strengths, step 310 may include suggesting or providing a modification of area of interest 100 to improve the Wi-Fi signal at at least a portion of area of interest 100. This may include, for example, moving devices emitting EMI farther from network-connected devices, such as computer 106. The recommended modification may be to replace or disconnect a device. The modification may include a reconfiguration of the modem/router 102 or network repeater 104. For example, the modification may include changing the configuration settings of router 102, such as changing the wireless channels, or using a different or both wireless bands (e.g., 2.4 GHz and 5.0 GHz bands). The recommended modification may be to disconnect an older device from the network, as devices with outdated technology may negatively impact wireless connections of other devices on the network. The modification may be moving the modem/router 102 or network repeater 104. The modification may be to install an additional router 102 or network repeater 104. The modification may be to turn off or move devices emitting EMI. Optionally, step 310 may include, with the modification, an indication of how much that modification would improve signal strength if implemented. This may be done in a number of ways. For example, the improvement may be measured based on certain points of interest in area of interest 100, or it may be measured based on the overall improvement of signal strength in area of interest 100. In an aspect, the indicators on the map may be altered to simulate the affect the modification would have. Step 310 may include providing multiple modifications. These modifications may be ranked based on ease, cost, or effect on signal strength, or the like.

Once the signal strength data is compiled, method 300 may include rendering the information for a user. For example, if network device 200 is a mobile device equipped with a camera, optical head-mounted display (e.g., Google® Glass), or other display that can be used for augmented reality. At step 312, method 300 may include determining a viewpoint of a user device. User device may be mobile device 104, network device 200, or any other device. Determining the viewpoint may be based on a relative location of the user device to one or more of the plurality of points. The viewpoint may also be based on relative or absolute location information, such as GPS information. Optionally, a user may confirm a viewpoint. Determining the viewpoint may also be based on processing an image captured by the camera of the user device. Step 312 may also include overlaying the image captured by the camera of the user device with the indicator at the reference point associated with a point within the area of interest. Step 312 may include periodically determining a viewpoint of the user and updating the overlaying accordingly based on the map. Alternative or in addition to visual indicators on the display, the user device may emit a vibration or sound based on a detected or calculated signal strength at that location. This may be helpful for a use to determine weak or strong signals in circumstances where eyesight is unreliable.

Figure 4:
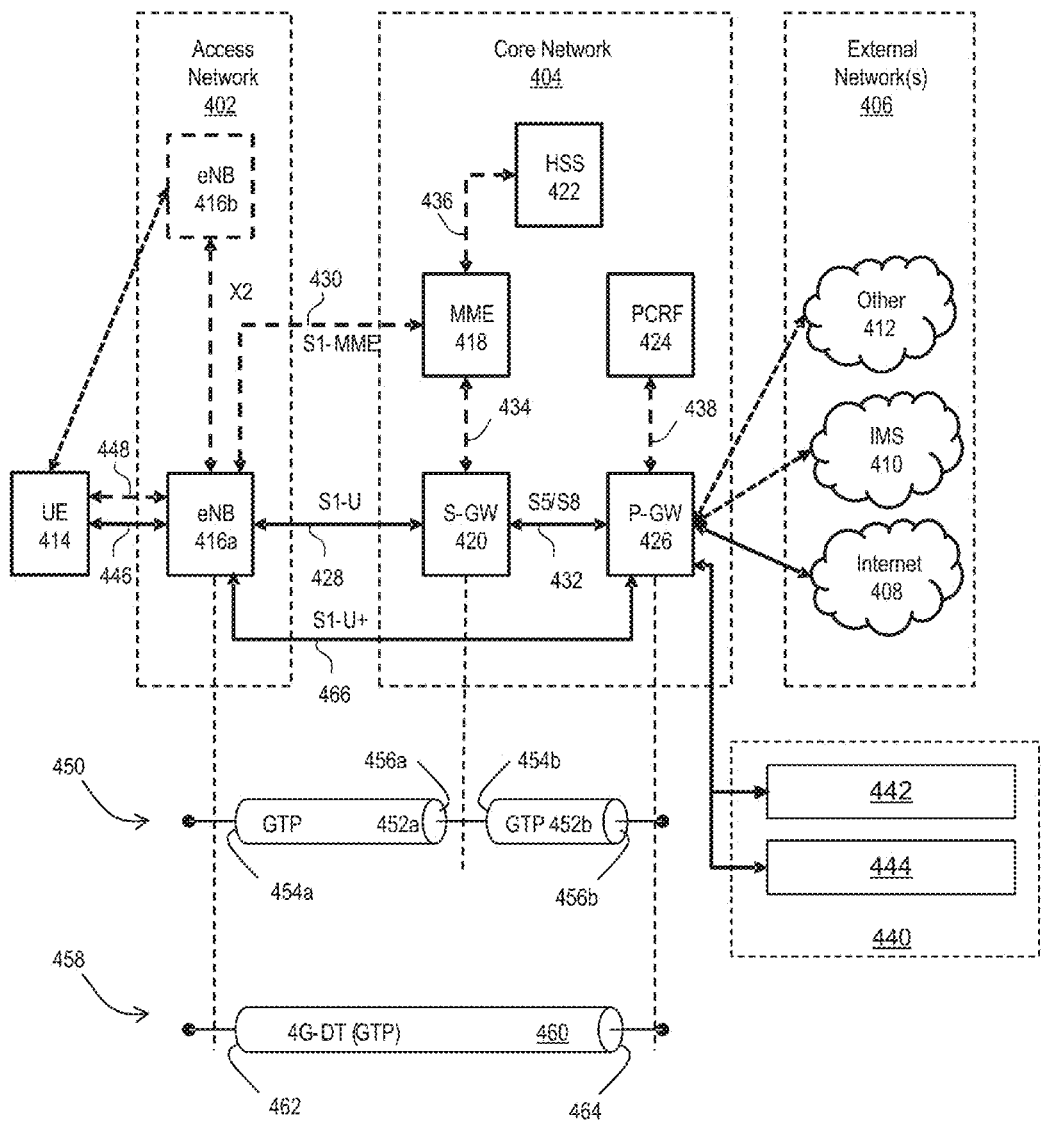
FIG. 4 depicts an exemplary communication system that provide wireless telecommunication services over wireless communication networks.

FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b (generally 110). During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416*a* to second eNB 416*b* as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring and/or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a*, a second portion (e.g., an S1 data bearer 428) between eNB 416*a* and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416*a*, and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452*a* between two tunnel endpoints 454*a* and 456*a*, and a second tunnel 452*b* between two tunnel endpoints 454*b* and 456*b*. In the illustrative example, first tunnel 452*a* is established between eNB 416*a* and SGW 420. Accordingly, first tunnel 452*a* includes a first tunnel endpoint 454*a* corresponding to an S1-U address of eNB 416*a* (referred to herein as the eNB S1-U address), and second tunnel endpoint 456*a* corresponding to an S1-U address of SGW 420 (referred to herein as the SGW S1-U address). Likewise, second tunnel 452*b* includes first tunnel endpoint 454*b* corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416*a* and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416*a* and PGW 426, by way of SGW 420. That is, SGW 420 can serve a relay function, by relaying packets between two tunnel endpoints 416*a*, 426. In other scenarios, direct tunneling solution 458 can forward user data packets between eNB 416*a* and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
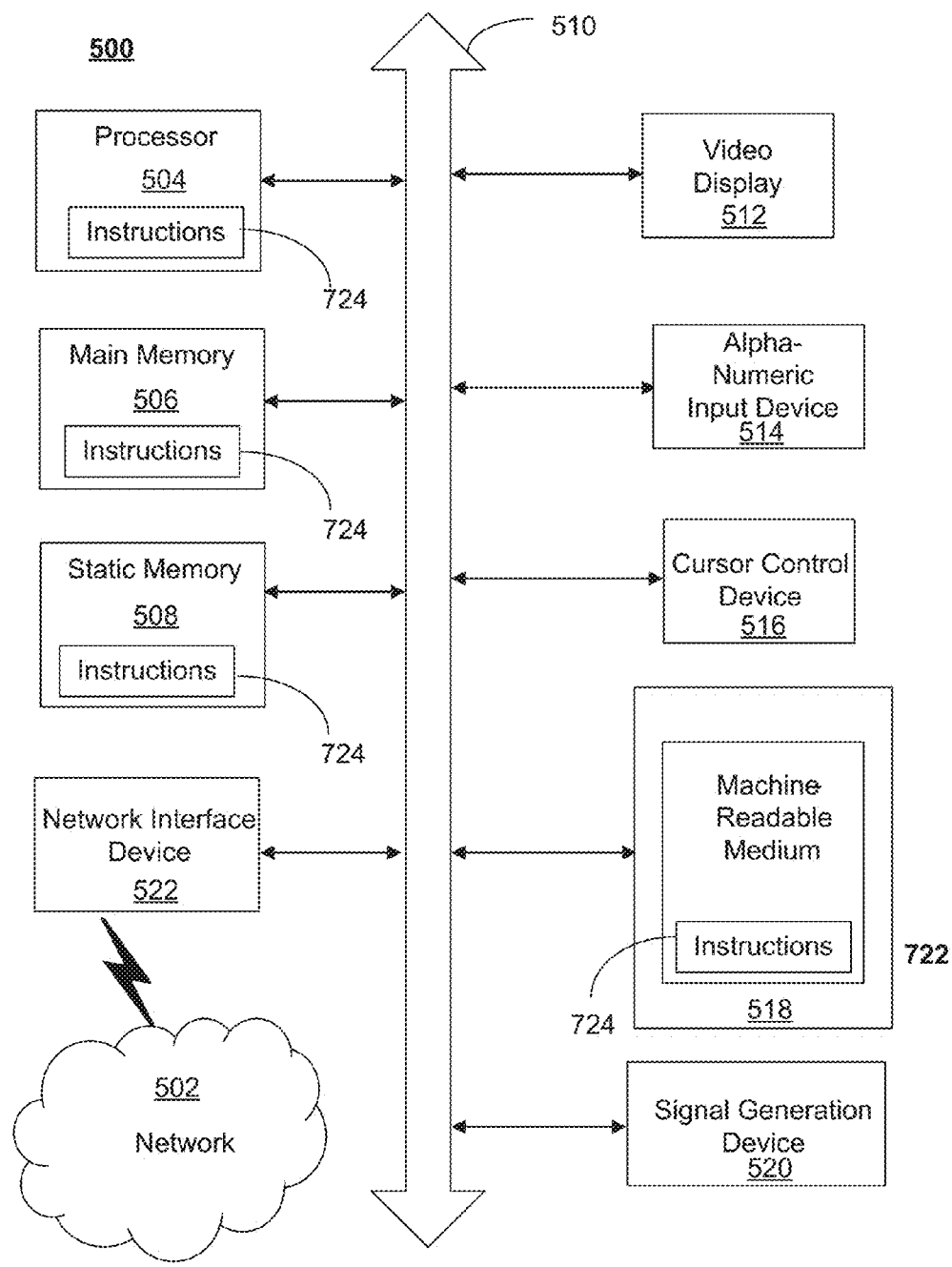
FIG. 5 depicts an exemplary communication system that provide wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 202, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
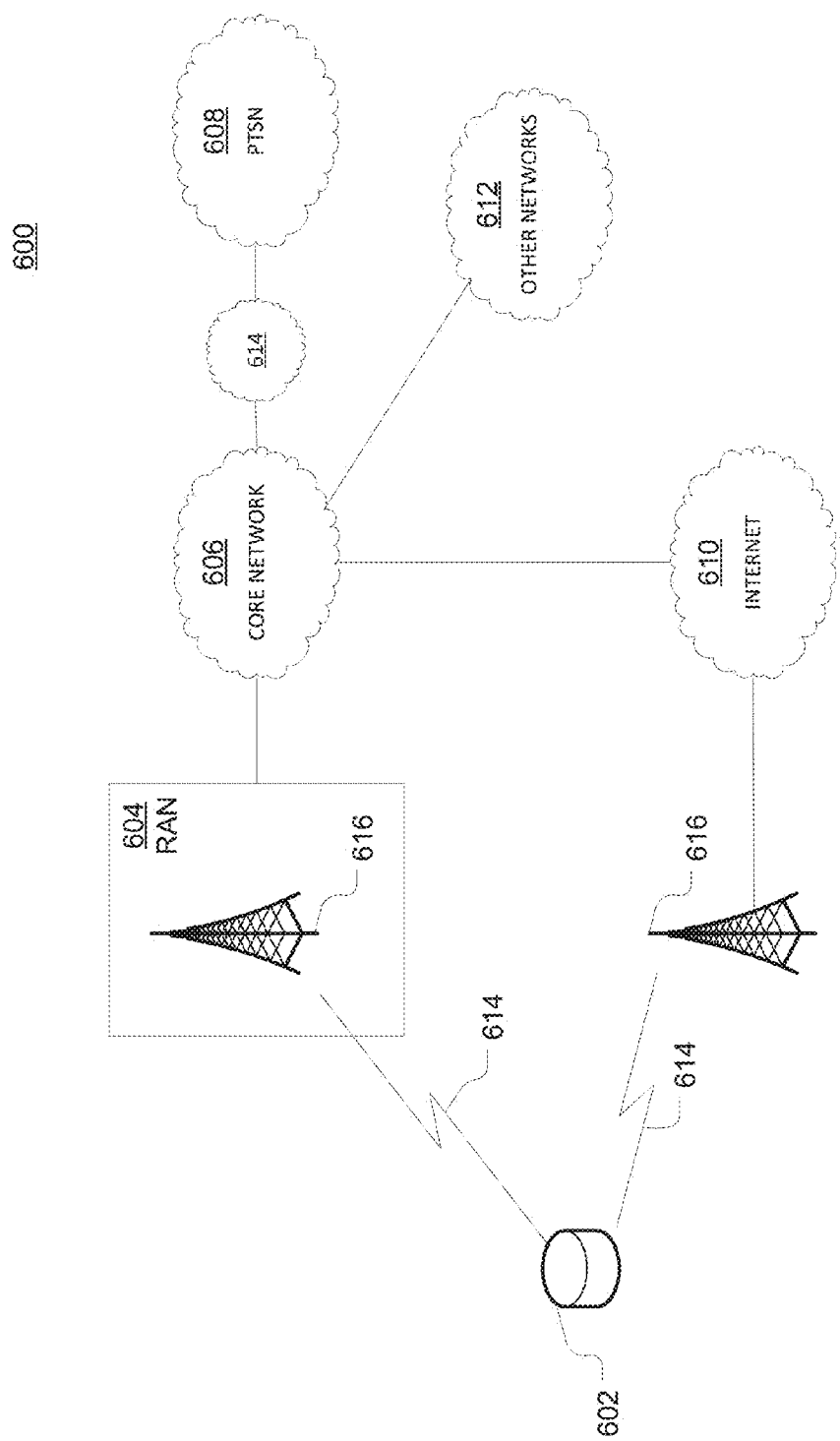
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise M2M device 108, a mobile device, network device 200, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
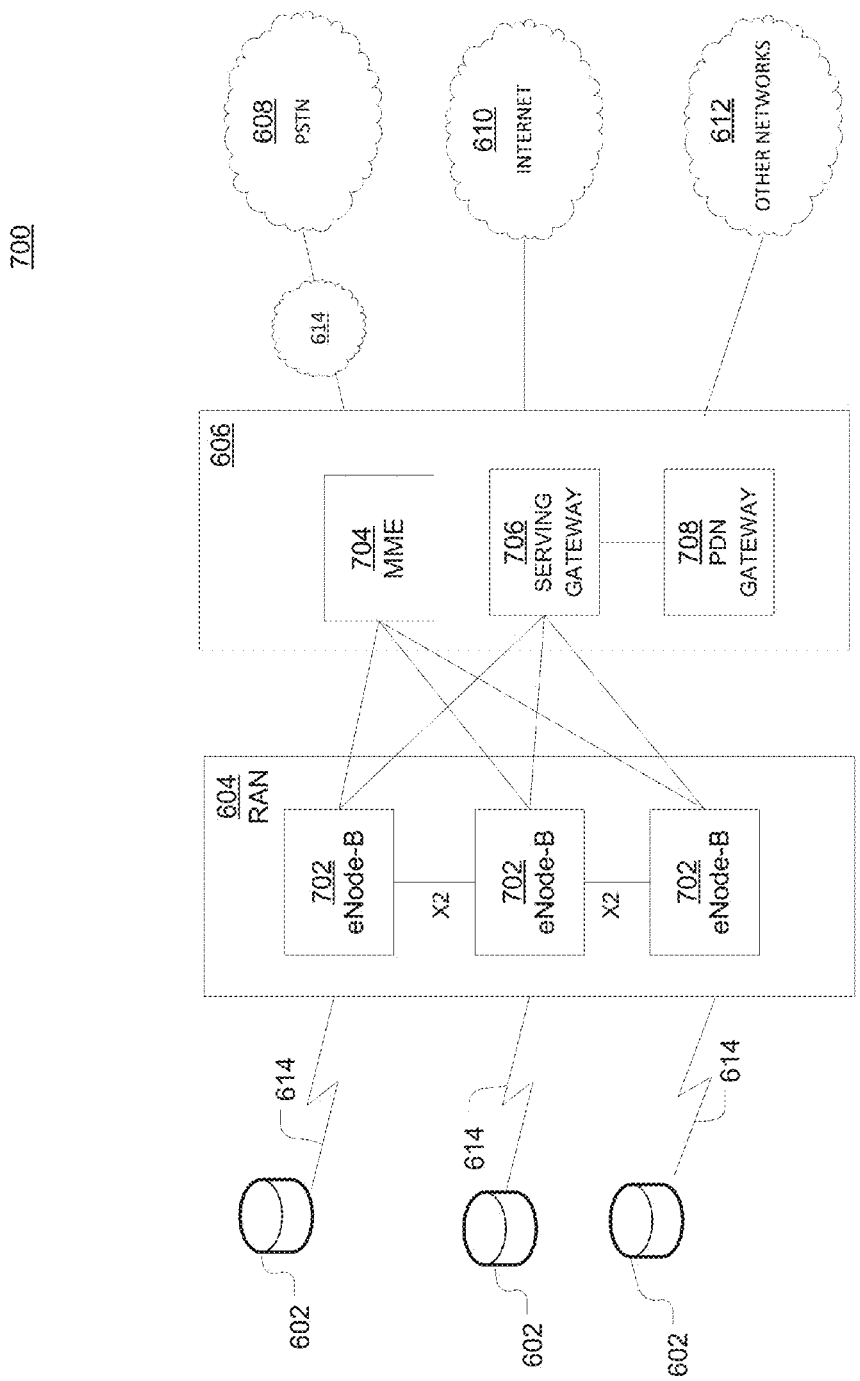
FIG. 7 is an example system diagram of a radio access network and a core network.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
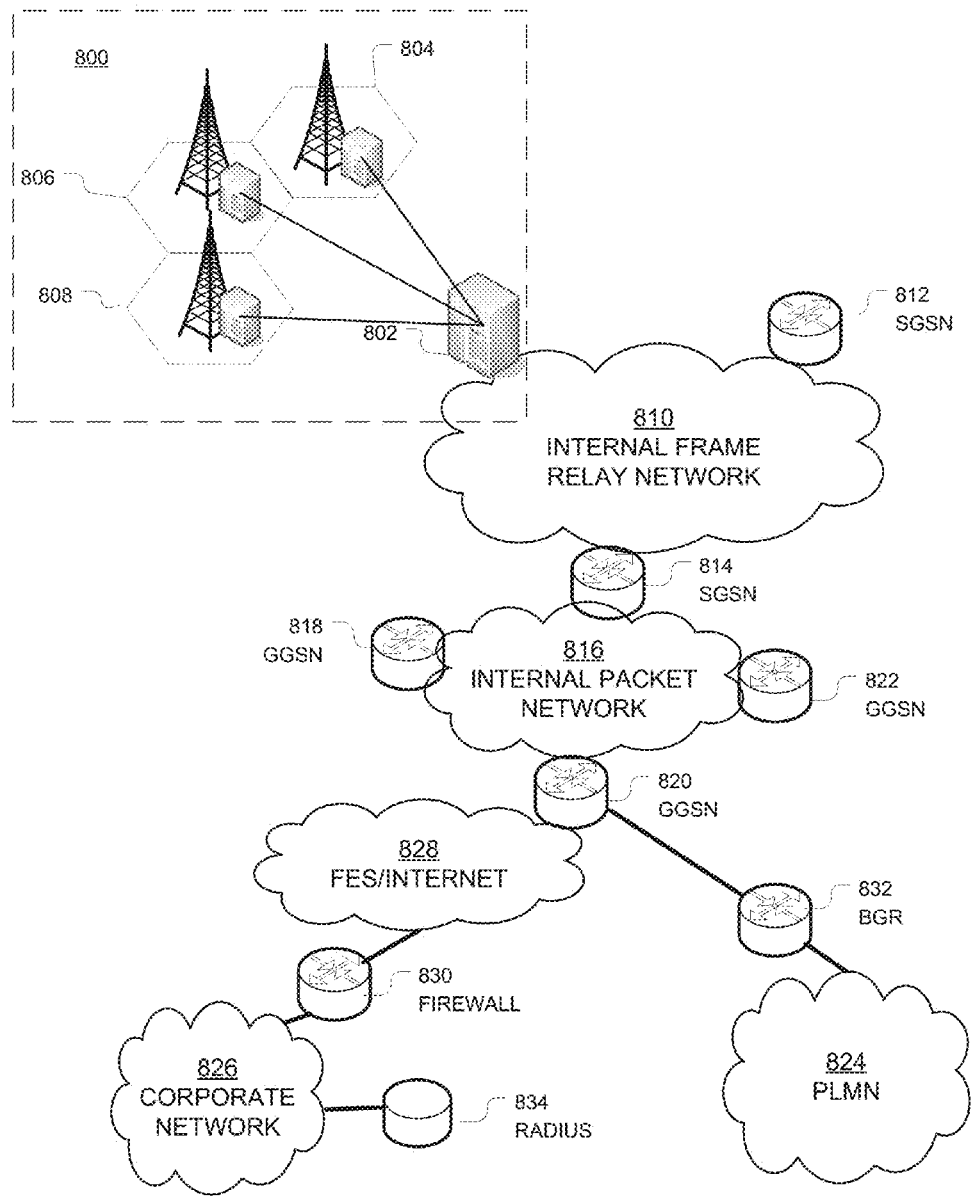
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a GSM network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
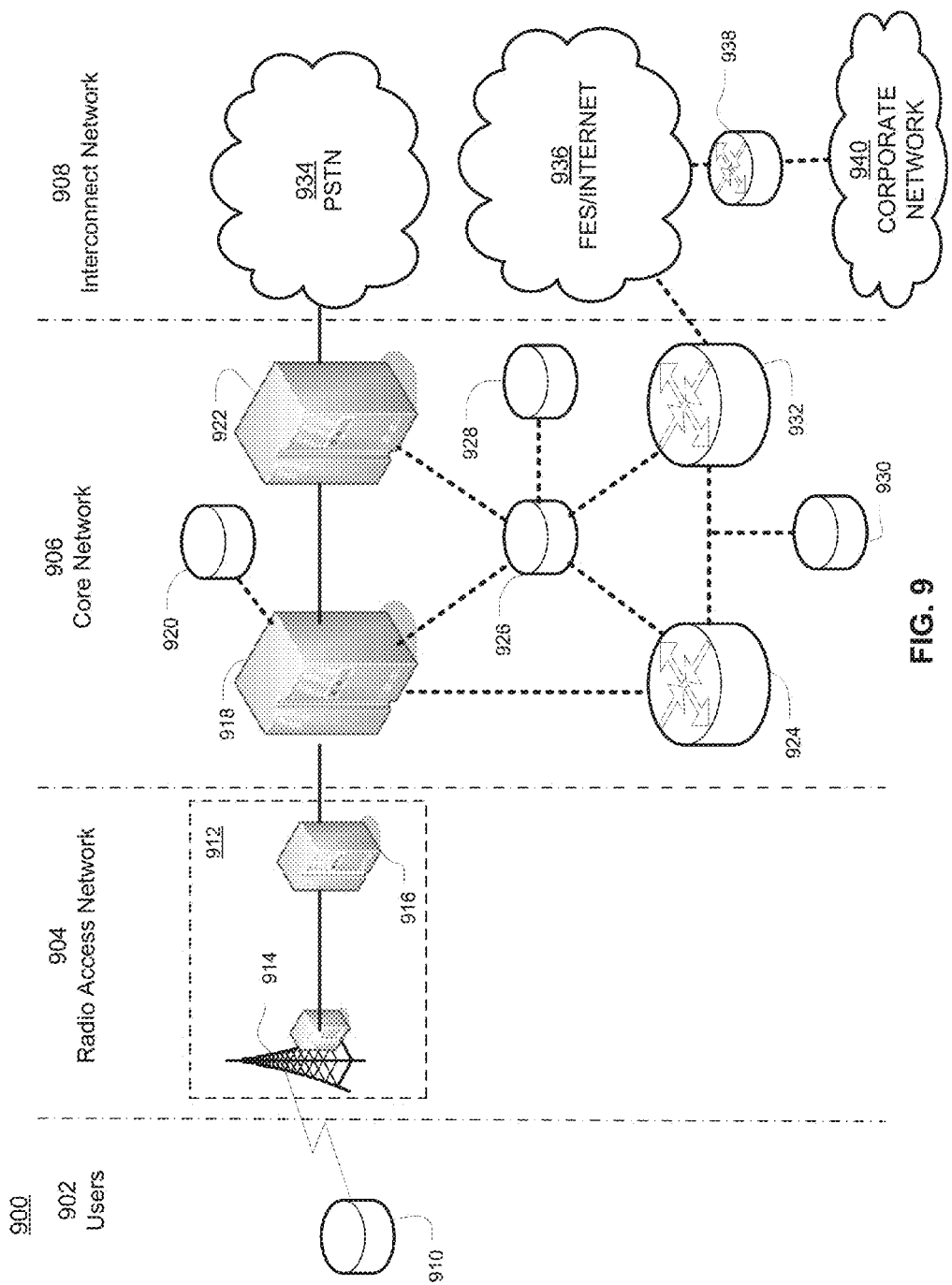
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 200, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1138, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1138, to reach corporate network 940.

Figure 10:
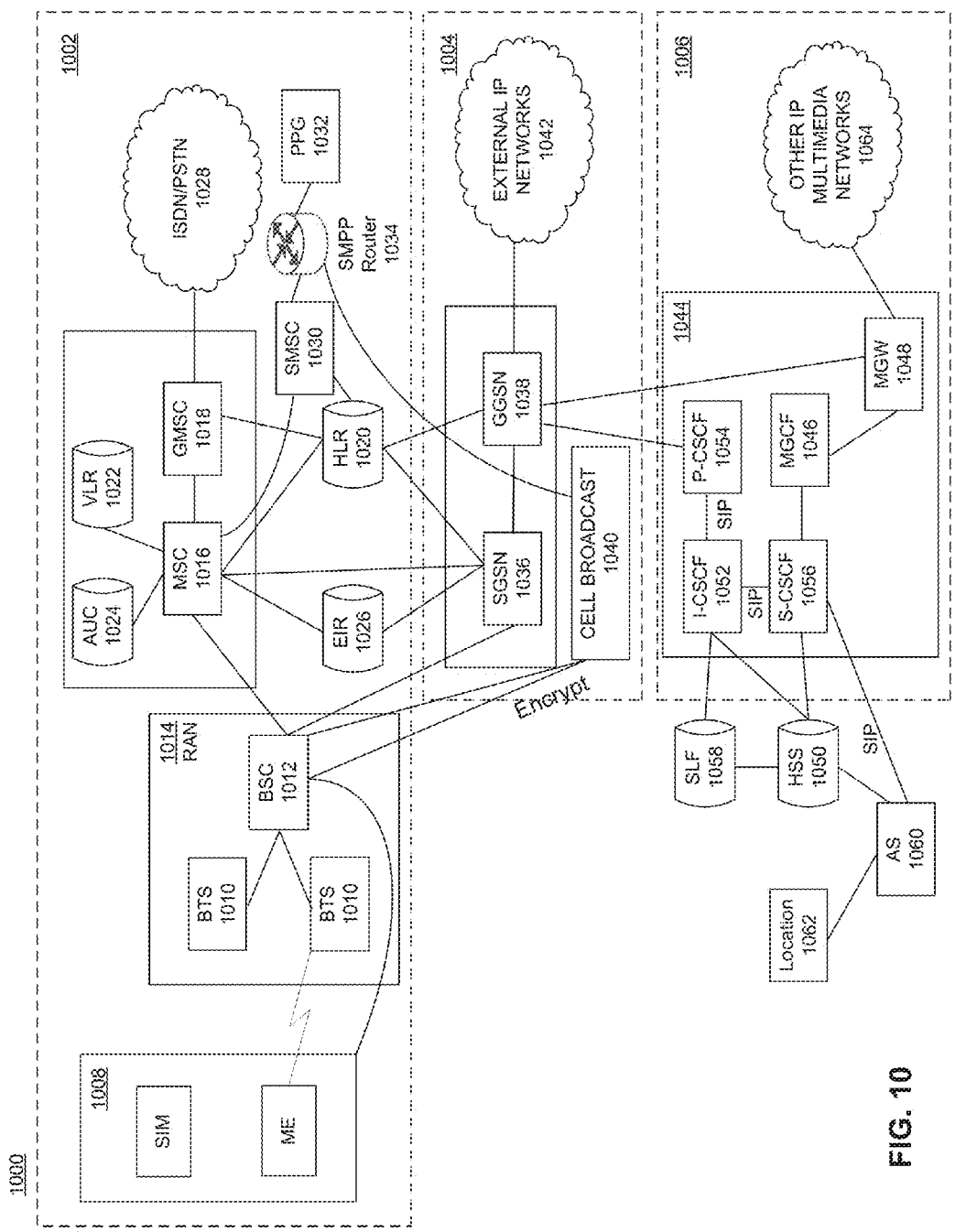
FIG. 10 illustrates an example block diagram view of a global system for mobile communications (GSM)/GPRS/internet protocol (IP) multimedia network architecture.

FIG. 10 illustrates an example block diagram view of a GSM/GPRS/IP multimedia network architecture 4000 as described herein. As illustrated, architecture 4000 includes a GSM core network 1002, a GPRS network 1004 and an IP multimedia network 1006. GSM core network 1002 includes an MS 1008, a BTS 1010, and a BSC 1012. MS 1008 is physical equipment or mobile equipment, such as a mobile phone or a laptop computer that is used by mobile subscribers, with a SIM or a Universal Integrated Circuit Card (UICC). The SIM or UICC includes an IMSI which is a unique identifier of a subscriber. BTS 1010 is physical equipment, such as a radio tower, that enables a radio interface to communicate with MS 1008. Each BTS 1010 may serve more than one MS 1008. BSC 1012 manages radio resources, including BTS 1010. BSC 1010 may be connected to several BTSs 1010. BSC 1012 and BTS 1010 components, in combination, are generally referred to as a BSS or RAN 1014.

GSM core network 1002 also includes a MSC 1016, a GMSC 1018, an HLR 1020, a visitor location register (VLR) 1022, an AuC 1024, and an equipment identity register (EIR) 1026. MSC 1016 performs a switching function for the network. MSC 1016 also performs other functions, such as registration, authentication, location updating, handovers, or call routing. GMSC 1018 provides a gateway between GSM network 1002 and other networks, such as an Integrated Services Digital Network (ISDN) or PSTN 1028. Thus, the GMSC 1018 provides interworking functionality with external networks.

HLR 1020 is a database that contains administrative information regarding each subscriber registered in corresponding GSM network 1002. HLR 1020 also contains the current location of each MS. VLR 1022 is a database that contains selected administrative information from HLR 1020. VLR 1022 contains information necessary for call control and provision of subscribed services for each MS 1008 currently located in a geographical area controlled by VLR 1022. HLR 1020 and VLR 1022, together with MSC 1016, provide the call routing and roaming capabilities of GSM. AuC 1024 provides the parameters needed for authentication and encryption functions. Such parameters allow verification of a subscriber's identity. EIR 1026 stores security-sensitive information about the mobile equipment.

An SMSC 1030 allows one-to-one short message service (SMS) messages to be sent to or from MS 1008. A push proxy gateway (PPG) 1032 is used to "push" (i.e., send without a synchronous request) content to MS 1008. PPG 1032 acts as a proxy between wired and wireless networks to facilitate pushing of data to MS 802. A short message peer-to-peer (SMPP) protocol router 1034 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, or SMS, MS 1008 first registers with the network to indicate its current location by performing a location update and IMSI attach procedure. MS 1008 sends a location update including its current location information to the MSC 1016/VLR 1022, via BTS 1010 and the BSC 1012. The location information is then sent to HLR 1020 of MS 1008. HLR 1020 is updated with the location information received from the MSC 1016/VLR 1022. The location update also is performed when MS 1008 moves to a new location area. Typically, the location update is periodically performed to update the database as location updating events occur.

GPRS network 1004 is logically implemented on GSM core network 1002 architecture by introducing two packet-switching network nodes, an SGSN 1036, a cell broadcast and a GGSN 1038. SGSN 1036 is at the same hierarchical level as MSC 1016 in GSM network 1002. SGSN 1036 controls the connection between GPRS network 1004 and MS 1008. SGSN 1036 also keeps track of individual MS 1008's locations and security functions and access controls.

A cell broadcast center (CBC) 1040 communicates cell broadcast messages that are typically delivered to multiple users in a specified area. Cell broadcast is one-to-many geographically focused service. It enables messages to be communicated to multiple mobile phone customers who are located within a given part of its network coverage area at the time the message is broadcast.

GGSN 1038 provides a gateway between GPRS network 1002 and a PDN or other external IP networks 1042. That is, GGSN 1038 provides interworking functionality with external networks, and sets up a logical link to MS 1008 through SGSN 1036. When packet-switched data leaves GPRS network 1004, it is transferred to a TCP-IP network 4042, such as an X.25 network or the Internet. In order to access GPRS services, MS 1008 first attaches itself to GPRS network 1004 by performing an attach procedure. MS 1008 then activates a PDP context, thus activating a packet communication session between MS 1008, SGSN 1036, and GGSN 1038.

In a GSM/GPRS network, GPRS services and GSM services can be used in parallel. MS 1008 can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1004 can be designed to operate in three network operation modes (NOM1, NOM2 and NOM3). A network operation mode of GPRS network 1004 is indicated by a parameter in system information messages transmitted within a cell. The system information messages dictates MS 1008 where to listen for paging messages and how to signal towards the network. The network operation mode represents the capabilities of GPRS network 1004. In a NOM1 network, MS 1008 can receive pages from a circuit switched domain (voice call) when engaged in a data call. MS 1008 can suspend the data call or take both simultaneously, depending on the ability of MS 1008 S. In a NOM2 network, MS 1008 may not receive pages from a circuit switched domain when engaged in a data call, since MS 1008 is receiving data and is not listening to a paging channel. In a NOM3 network, MS 1008 can monitor pages for a circuit switched network while receiving data and vice versa.

IP multimedia network 1006 was introduced with 3GPP Release 5, and includes an IP multimedia subsystem (IMS) 1044 to provide rich multimedia services to end users. A representative set of the network entities within IMS 1044 are a call/session control function (CSCF), a media gateway control function (MGCF) 1046, a media gateway (MGW) 1048, and a master subscriber database, called a home subscriber server (HSS) 1050. HSS 1050 may be common to GSM network 1002, GPRS network 1004 as well as IP multimedia network 1006.

IMS 1044 is built around the call/session control function, of which there are three types: an interrogating CSCF (I-CSCF) 1052, a proxy CSCF (P-CSCF) 1054, and a serving CSCF (S-CSCF) 1056. P-CSCF 1054 is the MS 1008's first point of contact with IMS 1044. P-CSCF 1054 forwards session initiation protocol (SIP) messages received from MS 1008 to an SIP server in a home network (and vice versa) of MS 1008. P-CSCF 1054 may also modify an outgoing request according to a set of rules defined by the network operator (for example, address analysis or potential modification).

I-CSCF 1052 forms an entrance to a home network and hides the inner topology of the home network from other networks and provides flexibility for selecting an S-CSCF 1056. I-CSCF 1052 may contact a subscriber location function (SLF) 1058 to determine which HSS 1050 to use for the particular subscriber, if multiple HSSs 1050 are present. S-CSCF 1056 performs the session control services for MS 1008. This includes routing originating sessions to external networks and routing terminating sessions to visited networks. S-CSCF 1056 also decides whether an application server (AS) 1060 is required to receive information on an incoming SIP session request to ensure appropriate service handling. This decision is based on information received from HSS 1050 (or other sources, such as AS 1060). AS 1060 also communicates to a location server 1062 (e.g., a GMLC) that provides a position (e.g., latitude/longitude coordinates) of MS 1008.

HSS 1050 contains a subscriber profile and keeps track of which core network node is currently handling the subscriber. It also supports subscriber authentication and authorization functions. In networks with more than one HSS 1050, SLF 1058 may provide information on the HSS 1050 that contains the profile of a given subscriber.

MGCF 1046 provides interworking functionality between SIP session control signaling from IMS 1044 and ISUP/BICC call control signaling from the external GSTN networks (not shown). It also controls a MGW 1048 that provides user-plane interworking functionality (e.g., converting between AMR- and PCM-coded voice). MGW 1048 also communicates with other IP multimedia networks 4064.

PoC-capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the predefined area.

Figure 11:
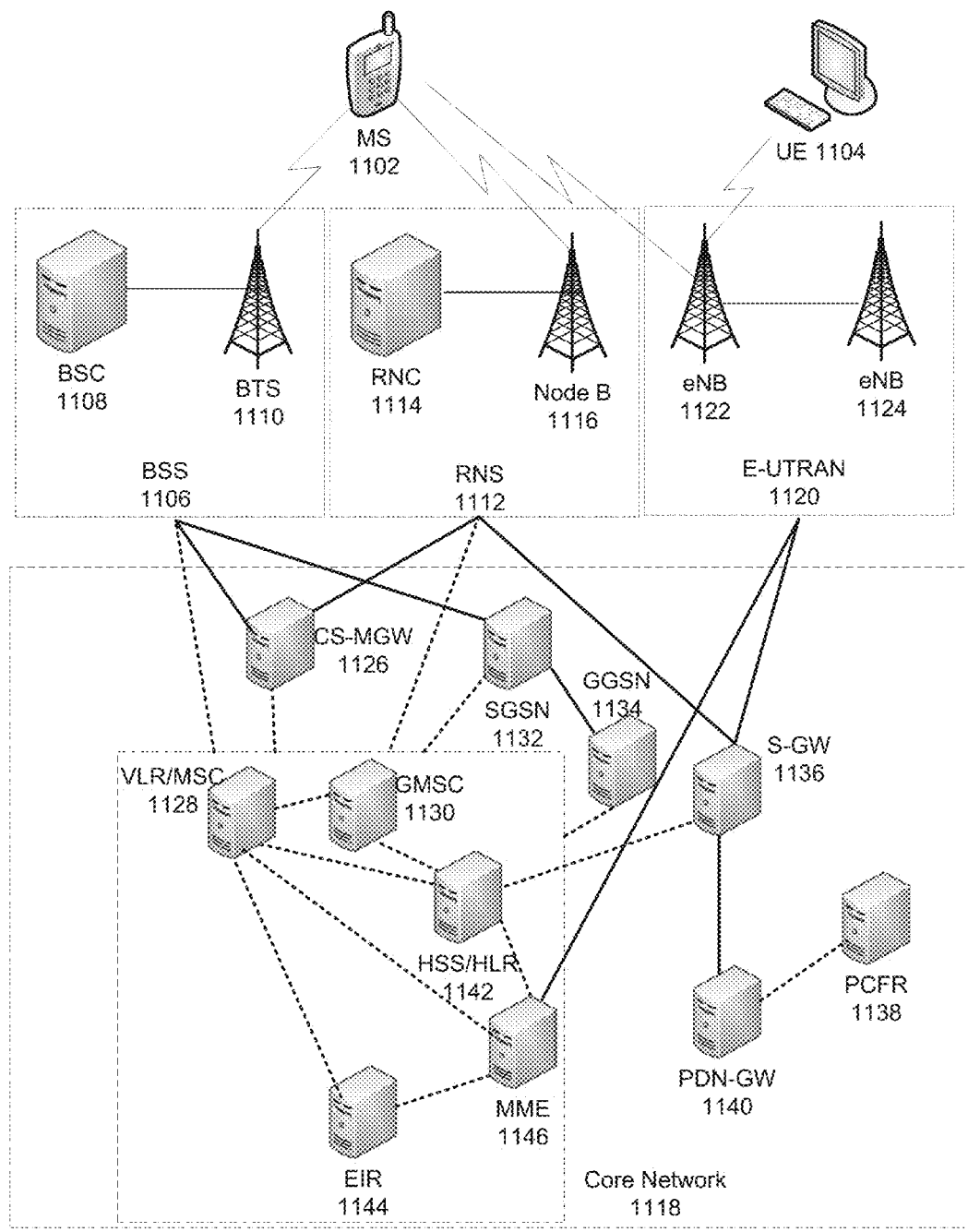
FIG. 11 is a block diagram of an exemplary public land mobile network (PLMN).

FIG. 11 illustrates a PLMN block diagram view of an example architecture that may be replaced by a telecommunications system. In FIG. 11, solid lines may represent user traffic signals, and dashed lines may represent support signaling. MS 1102 is the physical equipment used by the PLMN subscriber. For example, M2M device 108, network device 200, the like, or any combination thereof may serve as MS 1102. MS 1102 may be one of, but not limited to, a cellular telephone, a cellular telephone in combination with another electronic device or any other wireless mobile communication device.

MS 1102 may communicate wirelessly with BSS 1106. BSS 1106 contains BSC 1108 and a BTS 1110. BSS 1106 may include a single BSC 1108/BTS 1110 pair (base station) or a system of BSC/BTS pairs that are part of a larger network. BSS 1106 is responsible for communicating with MS 1102 and may support one or more cells. BSS 1106 is responsible for handling cellular traffic and signaling between MS 1102 and a core network 1118. Typically, BSS 1106 performs functions that include, but are not limited to, digital conversion of speech channels, allocation of channels to mobile devices, paging, or transmission/reception of cellular signals.

Additionally, MS 1102 may communicate wirelessly with RNS 1112. RNS 1112 contains a Radio Network Controller (RNC) 1114 and one or more Nodes B 1116. RNS 1112 may support one or more cells. RNS 1112 may also include one or more RNC 1114/Node B 1116 pairs or alternatively a single RNC 1114 may manage multiple Nodes B 1116. RNS 1112 is responsible for communicating with MS 1102 in its geographically defined area. RNC 1114 is responsible for controlling Nodes B 1116 that are connected to it and is a control element in a UMTS radio access network. RNC 1114 performs functions such as, but not limited to, load control, packet scheduling, handover control, security functions, or controlling MS 1102 access to core network 1118.

An E-UTRA Network (E-UTRAN) 1120 is a RAN that provides wireless data communications for MS 1102 and user equipment 1104. E-UTRAN 1120 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1120 may include of series of logical network components such as E-UTRAN Node B (eNB) 1122 and E-UTRAN Node B (eNB) 1124. E-UTRAN 1120 may contain one or more eNBs. User equipment 1104 may be any mobile device capable of connecting to E-UTRAN 1120 including, but not limited to, a personal computer, laptop, mobile device, wireless router, or other device capable of wireless connectivity to E-UTRAN 1120. The improved performance of the E-UTRAN 1120 relative to a typical UMTS network allows for increased bandwidth, spectral efficiency, and functionality including, but not limited to, voice, high-speed applications, large data transfer or IPTV, while still allowing for full mobility.

An example of a mobile data and communication service that may be implemented in the PLMN architecture described in FIG. 11 is EDGE. EDGE is an enhancement for GPRS networks that implements an improved signal modulation scheme known as 8-PSK (phase shift keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically MS 1102 may communicate with any or all of BSS 1106, RNS 1112, or E-UTRAN 1120. In a illustrative system, each of BSS 1106, RNS 1112, and E-UTRAN 1120 may provide Mobile Station 4162 with access to core network 1118. Core network 1118 may include of a series of devices that route data and communications between end users. Core network 1118 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1126 is part of core network 1118, and interacts with VLR/MSC server 1128 and GMSC server 1130 in order to facilitate core network 1118 resource control in the CS domain. Functions of CS-MGW 1126 include, but are not limited to, media conversion, bearer control, payload processing or other mobile network processing such as handover or anchoring. CS-MGW 1118 may receive connections to MS 1102 through BSS 1106 or RNS 1112.

SGSN 1132 stores subscriber data regarding MS 1102 in order to facilitate network functionality. SGSN 1132 may store subscription information such as, but not limited to, the IMSI, temporary identities, or PDP addresses. SGSN 1132 may also store location information such as, but not limited to, GGSN 1134 address for each GGSN where an active PDP exists. GGSN 1134 may implement a location register function to store subscriber data it receives from SGSN 1132 such as subscription or location information.

Serving gateway (S-GW) 1136 is an interface which provides connectivity between E-UTRAN 1120 and core network 1118. Functions of S-GW 1136 include, but are not limited to, packet routing, packet forwarding, transport level packet processing, or user plane mobility anchoring for inter-network mobility. PCRF 1138 uses information gathered from P-GW 1136, as well as other sources, to make applicable policy and charging decisions related to data flows, network resources or other network administration functions. PDN gateway (PDN-GW) 1140 may provide user-to-services connectivity functionality including, but not limited to, GPRS/EPC network anchoring, bearer session anchoring and control, or IP address allocation for PS domain connections.

HSS 1142 is a database for user information and stores subscription data regarding MS 1102 or user equipment 1104 for handling calls or data sessions. Networks may contain one HSS 1142 or more if additional resources are required. Example data stored by HSS 1142 include, but is not limited to, user identification, numbering or addressing information, security information, or location information. HSS 1142 may also provide call or session establishment procedures in both the PS and CS domains.

VLR/MSC Server 1128 provides user location functionality. When MS 1102 enters a new network location, it begins a registration procedure. A MSC server for that location transfers the location information to the VLR for the area. A VLR and MSC server may be located in the same computing environment, as is shown by VLR/MSC server 1128, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1102 registration or procedures for handover of MS 1102 to a different section of core network 1118. GMSC server 1130 may serve as a connection to alternate GMSC servers for other MSs in larger networks.

EIR 1144 is a logical element which may store the IMEI for MS 1102. User equipment may be classified as either "white listed" or "black listed" depending on its status in the network. If MS 1102 is stolen and put to use by an unauthorized user, it may be registered as "black listed" in EIR 1144, preventing its use on the network. A MME 1146 is a control node which may track MS 1102 or user equipment 1104 if the devices are idle. Additional functionality may include the ability of MME 1146 to contact idle MS 1102 or user equipment 1104 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
identifying a location of an electronic device;
based at least on the location, for each of a plurality of points within an area of interest, determining a signal strength;
associating each of the plurality of points with a reference point on a map of the area of interest;
including an indicator of the determined signal strength at each reference point;
determining a floor plan associated with the area of interest, wherein the map of the area of interest is based on at least the floor plan;
determining a viewpoint of a user device within the area of interest based on at least a relative location of the user device to at least one of the plurality of points, the user device configured to display an image indicative of the viewpoint;
overlaying the image with the indicator at the reference point associated with the at least one of the plurality of points; and
providing a modification to improve the signal strength at one of the plurality of points.

2. The method of claim 1, wherein the indicator of the determined signal strength at each reference point comprises at least one of a color-coded indicator, contour lines, or a symbol.

3. The method of claim 1, further comprising, based on the viewpoint of the user device and the relative location of the user device, causing the user device to emit a sound or vibration indicative of the signal strength associated with the at least one of the plurality of points.

4. The method of claim 1, wherein the electronic device comprises a wireless access point and the modification comprises moving the wireless access point to a different location.

5. The method of claim 1, wherein the electronic device comprises a wireless access point and the modification comprises changing a configuration of the wireless access point.

6. The method of claim 1, wherein providing the modification comprises providing an estimated improvement of the signal strength associated with at least one of the plurality of points.

7. The method of claim 1, further comprising:
identifying an interference associated with the electronic device,
wherein determining the signal strength at at least one of the plurality of points is further based on the interference.

8. A device comprising:
a display configured to display a map;
a processor; and
memory communicatively coupled to the processor, the memory storing executable instructions that, when executed by the processor, cause the processor to effectuate operations comprising:
identifying a location of an electronic device;
based at least on the location, for each of a plurality of points within an area of interest, determining a signal strength;
associating each of the plurality of points with a reference point on the map;
including an indicator of the determined signal strength at each reference point on the map; and
determining a floor plan associated with the area of interest, wherein the map of the area of interest is based on at least the floor plan;
determining a viewpoint of the device within the area of interest based on at least a relative location of the device to at least one of the plurality of points;
displaying on the display an image indicative of the viewpoint;
overlaying the image with the indicator at the reference point associated with the at least one of the plurality of points; and
determining a modification of the area of interest to improve the signal strength at at least one of the plurality of points.

9. The device of claim 8, wherein determining the floor plan is based on input from a user interface of the device.

10. The device of claim 8, wherein determining the floor plan is based on a walkthrough of the area of interest by the device.

11. The device of claim 8, wherein the operations further comprise based on the viewpoint and the relative location, causing the device to emit a sound or vibration indicative of the signal strength associated with the at least one of the plurality of points.

12. A nontransitory computer-readable medium comprising instructions that, when executed by a processor, cause the processor to effectuate operations comprising:
identifying a location of an electronic device;
based at least on the location, for each of a plurality of points within an area of interest, determining a signal strength;
associating each of the plurality of points with a reference point on a map of the area of interest;
including an indicator of the determined signal strength at each reference point;
determining a floor plan associated with the area of interest, wherein the map of the area of interest is based on at least the floor plan;
determining a viewpoint of a device within the area of interest based on at least a relative location of the device to at least one of the plurality of points;
displaying on the device an image indicative of the viewpoint;
overlaying the image with the indicator at the reference point associated with the at least one of the plurality of points; and
determining a modification of the area of interest to improve the signal strength at at least one of the plurality of points.

13. The nontransitory computer-readable storage medium of claim 12, wherein the electronic device comprises a router and the modification includes at least one of installing a second router; reconfiguring the router; replacing the router; installing a repeater; or moving the router.

14. The nontransitory computer-readable storage medium of claim 12, wherein the modification includes an indication of an estimated improvement of the signal strength associated with at least one of the plurality of points.

15. The nontransitory computer-readable storage medium of claim 12, wherein the operations further include:
 identifying an interference associated with the electronic device,
 wherein determining the signal strength at at least one of the plurality of points is further based on the interference.

\* \* \* \* \*